(12) United States Patent
Duffney

(10) Patent No.: US 11,739,666 B2
(45) Date of Patent: Aug. 29, 2023

(54) WASTE HEAT RECOVERY SYSTEM

(71) Applicant: ATLAS COPCO COMPTEC, LLC, Voorheesville, NY (US)

(72) Inventor: Jacob Earl Duffney, East Berne, NY (US)

(73) Assignee: ATLAS COPCO COMPTEC, LLC, Voorheesville, NY (US)

( * ) Notice: Subject to any disclaimer, the term of this patent is extended or adjusted under 35 U.S.C. 154(b) by 0 days.

(21) Appl. No.: 17/666,070

(22) Filed: Feb. 7, 2022

(65) Prior Publication Data
US 2022/0154603 A1 May 19, 2022

Related U.S. Application Data

(63) Continuation of application No. 15/829,315, filed on Dec. 1, 2017, now Pat. No. 11,280,226.
(Continued)

(51) Int. Cl.
*F01K 23/10* (2006.01)
*F04D 25/04* (2006.01)
(Continued)

(52) U.S. Cl.
CPC .............. *F01K 23/10* (2013.01); *F01K 23/12* (2013.01); *F02C 3/04* (2013.01); *F02C 6/04* (2013.01);
(Continued)

(58) Field of Classification Search
CPC ...... F02C 3/04; F02C 6/06; F02C 6/18; F02C 7/36; F01K 23/06; F01K 23/10;
(Continued)

(56) References Cited

U.S. PATENT DOCUMENTS 3,148,503 A * 9/1964 Macphail .............. F01K 23/101
60/39.182
3,215,342 A 11/1965 Perez
(Continued)

FOREIGN PATENT DOCUMENTS

CN 1099458 A 3/1995
CN 207673437 U 7/2018
(Continued)

OTHER PUBLICATIONS

International Search Report and Written Opinion in corresponding PCT Patent Application No. PCT/US2017/064200 dated Feb. 16, 2018. 12 pages.
(Continued)

*Primary Examiner* — Alain Chau
(74) *Attorney, Agent, or Firm* — Schmeiser, Olsen & Watts, LLP

(57) ABSTRACT

A waste heat recovery system including a drive unit, the drive unit having a drive shaft, a compressor, the compressor operably coupled to the drive shaft, wherein operation of the drive unit drives the compressor, and a waste heat recovery cycle, the waste heat recovery cycle coupled to the drive unit and the compressor, wherein a waste heat of the drive unit powers the waste heat recovery cycle, such that the waste heat recovery cycle transmits a mechanical power to the compressor, is provided. Furthermore, an associated method is also provided.

14 Claims, 3 Drawing Sheets

Related U.S. Application Data

(60) Provisional application No. 62/431,491, filed on Dec. 8, 2016.

(51) Int. Cl.

| | | |
|---|---|---|
| *F02C 6/18* | (2006.01) | |
| *F04D 29/053* | (2006.01) | |
| *F04D 19/02* | (2006.01) | |
| *F02C 6/06* | (2006.01) | |
| *F04D 25/02* | (2006.01) | |
| *F04D 25/16* | (2006.01) | |
| *F02C 7/36* | (2006.01) | |
| *F02C 6/04* | (2006.01) | |
| *F01K 23/12* | (2006.01) | |
| *F02C 3/04* | (2006.01) | |
| *F01K 25/08* | (2006.01) | |

(52) U.S. Cl.
CPC ............... *F02C 6/06* (2013.01); *F02C 6/18* (2013.01); *F02C 7/36* (2013.01); *F04D 19/02* (2013.01); *F04D 25/024* (2013.01); *F04D 25/04* (2013.01); *F04D 25/163* (2013.01); *F01K 25/08* (2013.01); *F04D 29/053* (2013.01); *F05D 2220/32* (2013.01); *F05D 2220/62* (2013.01); *Y02E 20/14* (2013.01)

(58) Field of Classification Search
CPC ...... F01K 23/12; F01K 23/064; F01K 23/065; F01K 23/068; F01K 23/101–108; F05D 2220/62; F04D 25/024; F04D 25/04; F04D 29/053

See application file for complete search history.

(56) References Cited

U.S. PATENT DOCUMENTS

| | | | |
|---|---|---|---|
| 3,500,636 A | 3/1970 | Craig | |
| 3,731,495 A | 5/1973 | Coveney | |
| 3,796,045 A | 3/1974 | Foster | |
| 3,942,908 A | 3/1976 | Pilarczyk | |
| 3,976,165 A | 8/1976 | Pilarczyk | |
| 4,057,371 A | 11/1977 | Pilarczyk | |
| 4,204,401 A | 5/1980 | Earnest | |
| 4,271,664 A | 6/1981 | Earnest | |
| 4,271,665 A | 6/1981 | Mandrin | |
| 4,785,621 A | 11/1988 | Alderson et al. | |
| 5,402,631 A | 4/1995 | Wulf | |
| 5,595,059 A | 1/1997 | Huber et al. | |
| 5,813,215 A * | 9/1998 | Weisser | F02C 6/003 60/39.181 |
| 6,256,994 B1 | 7/2001 | Dillon, IV | |
| 6,499,303 B1 | 12/2002 | Polukort et al. | |
| 8,001,760 B2 * | 8/2011 | Harada | F02C 6/18 60/39.182 |
| 8,181,439 B2 * | 5/2012 | Harada | F02C 6/18 60/39.182 |
| 8,414,250 B2 | 4/2013 | Hansen et al. | |
| 8,863,492 B2 | 10/2014 | Helmers | |
| 9,777,629 B2 * | 10/2017 | Nakamoto | F02C 3/20 |
| 10,012,136 B2 * | 7/2018 | Shor | F02B 39/085 |
| 10,533,495 B2 * | 1/2020 | Nakamoto | H01M 8/04201 |
| 10,641,177 B2 * | 5/2020 | Brostmeyer | F02C 7/185 |
| 10,934,894 B2 * | 3/2021 | Copeland | F01K 21/045 |
| 2009/0235671 A1 | 9/2009 | Rabovitser et al. | |
| 2010/0089023 A1 | 4/2010 | Harada et al. | |
| 2010/0288571 A1 | 11/2010 | Dewis et al. | |
| 2011/0146225 A1 * | 6/2011 | Harada | F02C 3/22 60/39.182 |
| 2011/0209496 A1 | 9/2011 | Horlyk et al. | |
| 2014/0069141 A1 | 3/2014 | Yonemura et al. | |
| 2014/0238039 A1 | 8/2014 | Zhang et al. | |
| 2016/0047307 A1 * | 2/2016 | Williamson | F02C 7/06 60/726 |
| 2016/0169106 A1 | 6/2016 | Kim | |
| 2016/0273456 A1 * | 9/2016 | Zhang | F02C 7/22 |
| 2017/0058760 A1 * | 3/2017 | Shor | F01K 23/10 |
| 2018/0066586 A1 * | 3/2018 | Brostmeyer | F01K 23/10 |
| 2018/0371954 A1 * | 12/2018 | Copeland | F02C 6/006 |

FOREIGN PATENT DOCUMENTS

| | | |
|---|---|---|
| JP | S54113331 A | 9/1979 |
| JP | S63230911 A | 9/1988 |
| JP | 0544906 A | 2/1993 |
| JP | H06299867 A | 10/1994 |
| JP | 11257026 A | 9/1999 |
| JP | 2005147111 A | 6/2005 |
| JP | 2013072356 A | 4/2013 |

OTHER PUBLICATIONS

Office Action in corresponding Chinese Patent Application No. 201711292953.X dated Nov. 4, 2020. 7 pages.

Office Action in corresponding Japanese Patent Application No. 2019-529557 dated Aug. 31, 2021. 6 pages.

Office Action in related Chinese Patent Application No. 201711292953.X dated Jul. 23, 2021. 6 pages.

Office Action in related Korean Patent Application No. 10-2019-7019058 dated Aug. 30, 2021. 9 pages.

* cited by examiner

WASTE HEAT RECOVERY SYSTEM

CROSS-REFERENCE TO RELATED APPLICATIONS

This application is a continuation application claiming priority to and the benefit of U.S. Ser. No. 15/829,315, filed Dec. 1, 2017, and entitled, "Waste Heat Recovery System," that claims priority to and the benefit of U.S. Provisional Application No. 62/431,491, filed Dec. 8, 2016, and entitled, "Waste Heat Recovery System."

FIELD OF TECHNOLOGY

The following relates to system for waste heat recovery, and more specifically to embodiments of a system and method for using waste heat from a drive unit to assist in powering a compressor and/or other auxiliary systems.

BACKGROUND

Gas turbines are a common choice as a compressor driver in regions where electrical power is not readily available. Compressors driven by gas turbines, which include types such as piston, barrel or integrally geared centrifugal compressors, are often used to facilitate the transport of gas in pipelines. In this installation scheme, the gas turbine uses some of the gas from the pipeline as fuel for the gas turbine that powers the compressor to re-pressurize the pipeline gas to overcome the losses that occur due to the transportation process.

Although gas turbine manufacturers have done their best to capture as much energy as possible from the combustion process, all gas turbines inherently produce waste heat. In some cases, a Heat Recovery through Steam Generation (HRSG) system is employed to convert this waste heat to electricity (this is also known as a form of Cogeneration in the power industry). In other cases, the waste heat is used directly, such for HVAC heating. However, most of the gas turbines used to drive compressors are located in remote regions where there often is no use for either electricity or HVAC; thus, the waste heat is thrown away, representing a permanent loss.

Thus, a need exists for a system and method that can capture the waste heat from the gas turbine and use the waste heat to assist in driving the compressor.

SUMMARY

A first aspect relates generally to a waste heat recovery system and method that captures the waste heat from turbine heat source and uses the waste heat to assist in driving the compressor or other auxiliary systems.

A second aspect relates generally to a waste heat recovery system comprising: a drive unit, the drive unit having a drive shaft, a compressor, the compressor operably coupled to the drive shaft, wherein operation of the drive unit drives the compressor, and a waste heat recovery cycle, the waste heat recovery cycle coupled to the drive unit and the compressor, wherein a waste heat of the drive unit powers the waste heat recovery cycle, such that the waste heat recovery cycle transmits a mechanical power to the compressor.

A third aspect relates generally to a method of using waste heat recovery to assist in driving/powering a compression system, comprising: coupling a waste heat recovery cycle to a drive unit and a compressor, and delivering a mechanical power from the waste heat recovery cycle to the compressor.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
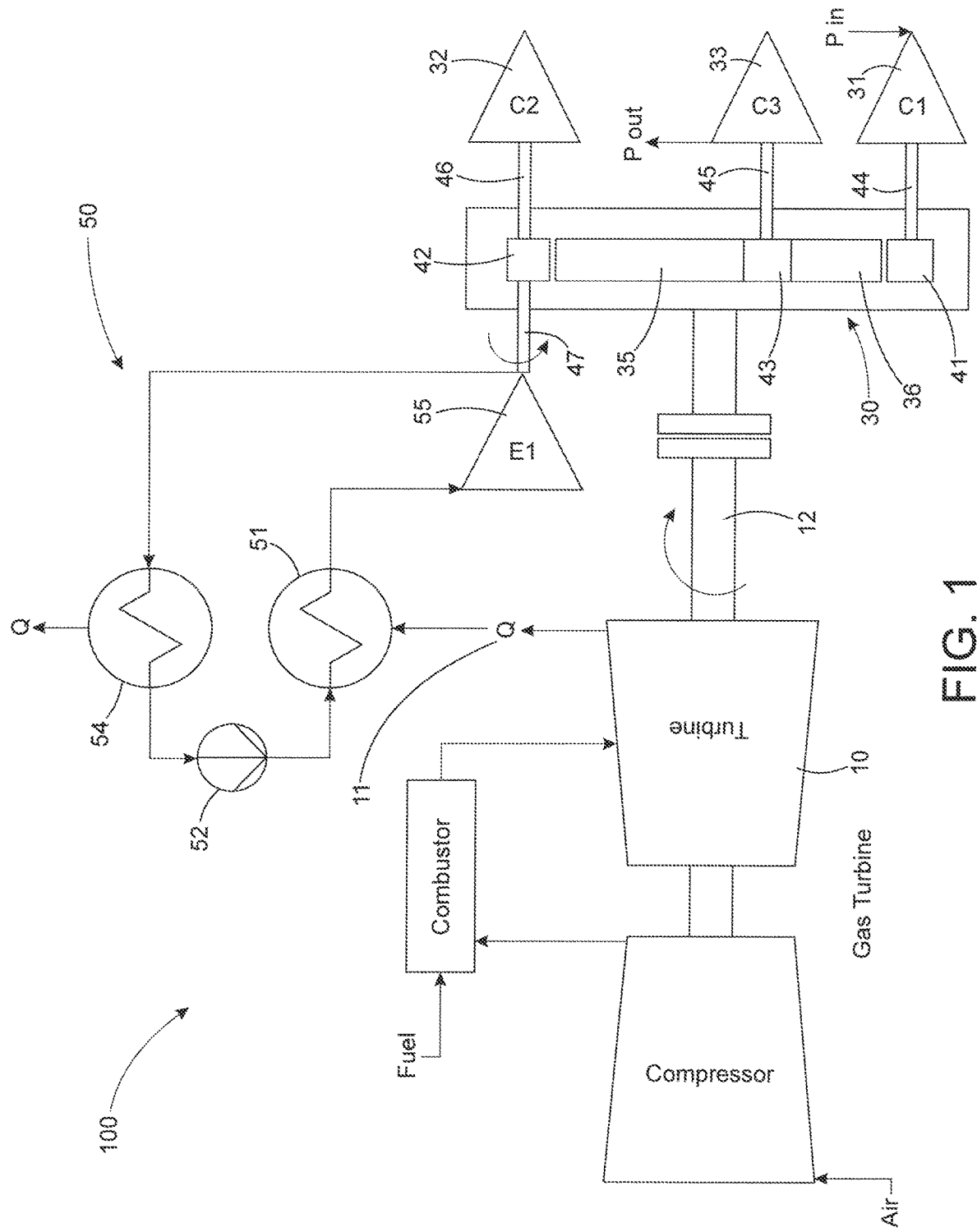
FIG. 1 depicts a schematic illustration of a first embodiment of a waste heat recovery system.

Referring to the drawings, FIG. 1 depicts embodiments of a waste heat recovery system 100. Embodiments of the waste heat recovery system 100 may use a waste heat such as but not exclusively the exhaust gas 11 from a drive unit 10, such as a gas turbine, that is used to drive a compressor 30 or other auxiliary systems related to the train, such as an oil pump, cooling fan(s), cooling water pump, a seal system compression, etc., to heat a working fluid in a closed loop system that produces mechanical power. Although embodiments of the present invention may be described with respect to a waste heat source of a drive unit 10, the waste heat 11 may also be utilized from one or more other heat sources that is part of the cycle, which may be in addition to the drive unit 10. The waste heat 11 may be eventually used to power directly or to assist in powering, driving, and/or running the compression process of the compressor 30. Utilizing the waste heat 11 to assist in powering the compressor 30 or other components or auxiliary systems may eliminate many limiting factors of the typical waste heat recovery scenarios. Moreover, embodiments of the waste heat recovery system 100 may use the power directly to assist in a drive train shaft power, thereby creating many advantages to one or more existing arrangements. These advantages include a reduced complexity due to elimination of a generator and all associated switchgear and wiring, and a greater efficiency due to direct use of the power without the losses associated with converting the mechanical power into electricity, transmission losses, and further losses when converting the electricity back to mechanical power.

In an exemplary embodiment of the waste heat recovery system 100, an Organic Rankine Cycle (ORC) may be used to convert the waste heat 11 from the drive unit 10 or other heat source to a mechanical power transmitted through a pinion shaft 47 to the compressor 30. The mechanical power transmitted to the compressor 30 through implementation of the waste heat recovery system 100 may reduce a power required directly from the drive unit 10 to drive/power the compressor 30, thereby increasing overall system efficiency. For example, embodiments of the waste heat recovery system 100 may result in the drive unit 10 requiring less fuel/gas, and therefore producing fewer emissions, which are both highly desirable outcomes. In some embodiments, employing the waste heat recovery system 100 may allow the use of a smaller drive unit/gas turbine (compared to a size required if the waste heat is not converted to power used by the compressor).

While exemplary embodiments may use an Organic Rankine Cycle (ORC), other working fluids, such as water (steam) or even different thermodynamic cycles may be used. Further, there are a number of different ways in which the power derived from the waste heat 11 can be used for assisting the powering of the compressor 30. For instance, the power may be fed to a pinion, such as a pinion that connects to a drive gear in the compressor 30, and this pinion may or may not also have an impeller, or the power may be fed directly to one or more compressor stages. Exemplary embodiments of the waste heat recovery system 100 are shown and described below with reference to FIGS. 1-3.

With continued reference to FIG. 1, embodiments of the waste heat recovery system 100 may include a driving unit 10, a waste heat recovery cycle 50, and a compressor 30. Embodiments of the waste heat recovery system 100 may include a drive unit 10, the drive unit 10 having a drive shaft 12, a compressor 30, the compressor 30 operably coupled to the drive shaft 12, wherein operation of the drive unit 10 drives the compressor 30, and a waste heat recovery cycle 50, the waste heat recovery cycle 50 coupled to the drive unit 10 and the compressor 30, wherein a waste heat 11 of the drive unit 10 powers the waste heat recovery cycle 50, such that the waste heat recovery cycle 50 transmits a mechanical power to the compressor 30. In an exemplary embodiment, the waste heat recovery system 100 may convert, utilize, harness, use, utilize, etc. waste or exhaust heat (e.g. exhaust gas) from a turbine, engine, piston, driver, drive unit into shaft power. For example, waste heat, such as warm and/or hot exhaust gas may be recovered, captured, etc. and used to add shaft power to a compressor unit.

Embodiments of the waste heat recovery system 100 may include a driving unit 10. In an exemplary embodiment, the driving unit 10 may be a gas turbine, a gas engine, a piston, a driver, and the like, or any device that is configured to perform work and give off heat. Embodiments of the drive unit 10 may include a drive shaft 12. The drive shaft 12 may be driven by the drive unit 10. Embodiments of the drive unit 10 or driving source, such as a gas turbine, may drive, rotate, or otherwise transmit torque to the drive shaft 12 or other shaft or armature of a machine. When the drive shaft 12 is acted upon by the drive unit 10, the drive unit 10 may interface with the compressor 30 to actuate/operate one or more compressor stages. In an embodiment where the compressor 30 is an integrally geared compressor, the drive unit 10 may cooperate with a drive gear 35 of the compressor 30, which meshes with or otherwise mechanically engages a plurality of pinions, such as a first pinion 41, a second pinion 42, and a third pinion 43. Accordingly, the plurality of pinions 41, 42, 43 are rotated in response to the rotation of the drive shaft 12 and drive gear 35, which is rotated by the drive unit 10.

As a result of the drive unit 10 operating to rotate the drive shaft 12, hot exhaust gases, such as waste heat 11, are given off by the drive unit 10. The waste heat 11 of the drive unit 10 may be received by the waste heat recovery cycle 50. For instance, waste heat 11 may be received, collected, accepted, obtained, recovered by the waste heat recovery cycle 50, or otherwise introduced into the waste heat recovery cycle 50. In other words, the waste heat recovery cycle 50 may be powered by the hot waste heat exhaust 11 from the drive unit 10, such as a gas turbine. Embodiments of the waste heat recovery cycle 50 may be operably connected to the drive unit 10. In an exemplary embodiment, the waste heat recovery cycle 50 may be in fluid communication with the drive unit 10. In another embodiment, the waste heat recovery cycle 50 may be connected to the drive unit 10 by one or more pipes, lines, pipelines, ducts, tubes, or other means for passing a fluid from a first component to a second component. The waste heat 11 may travel from the drive unit 10 through one or more pipes to the waste heat recovery cycle 50. Embodiments of the waste heat recovery cycle 50 may be an organic rankine cycle, or other thermodynamic cycle, that may convert heat into work. The organic rankine cycle may include a working fluid, the working fluid being various, known working fluids associated with the organic rankine cycle. In other thermodynamic cycles, a working fluid may be water (steam). The cycle 50 may be a closed loop cycle, wherein the waste heat 11 of the drive unit 10 is supplied externally to the closed loop. In further embodiments, the waste heat 11 may be indirectly transferred to the waste heat recovery loop 50 (e.g. to the evaporator 51) through an additional transfer medium, such as employing a thermal oil loop.

Embodiments of the waste heat recovery cycle 50 may include an evaporator 51, an expansion mechanism 55, a condenser 54, and a pump 52. The components of the cycle 50 may be operably connected to each other in a closed loop. Embodiments of the evaporator 51 may be a heat exchanger, configured to evaporate a working fluid, such as a high pressure liquid flowing through the closed loop cycle 50. For instance, the hot exhaust gasses from the drive unit 10 may flow through the evaporator 51 to evaporate the working fluid of the cycle 50. By operation of the waste heat 11 flowing through the evaporator 51, the working fluid of the cycle 50 may be evaporated to a gaseous form/phase, and the gas may be directed to the expansion mechanism 55, thus generating power that may be transmitted to the compressor 30 through a coupling between the expansion mechanism 55 and the compressor 30, wherein the coupling may be a shaft, a rotating shaft, pinion shaft etc., depicted as pinion shaft 47 in FIG. 1. Embodiments of the expansion mechanism 55 may be operably connected to the evaporator 51 via one or more lines, pipes, etc. to transfer or otherwise direct the evaporated working fluid to the expansion mechanism 55.

Embodiments of the expansion mechanism 55 may be an expansion device, an expander, a turboexpander, and the like, configured to remove or otherwise harness energy from the high-pressured gas from the evaporator 51 to produce mechanical power. Specifically, embodiments of the expansion mechanism 55 may be an expansion turbine, screw, tooth, scroll, and the like. Moreover, embodiments of the expansion mechanism 55 may be operably connected to the compressor 30. In exemplary embodiments, the expansion mechanism 55 may be mechanically coupled to the compressor 30 via a pinion shaft 47. For example, the expansion mechanism 55 may be mechanically coupled to one end of the pinion shaft 47. The opposing end of the pinion shaft 47 may be operably mechanically coupled to the compressor

30. In one embodiment, the opposing end of the pinion shaft 47 may be operably connected to the second pinion 42 associated with a second compressor stage 32 of the compressor 30. In other embodiments, the expansion mechanism 55 may be connected to or otherwise mounted on a pinion that runs closest to an ideal speed for the expansion mechanism 55 and such pinion does not have a compressor stage mounted on it. Accordingly, embodiments of the expansion mechanism 55, through receiving the gas from the evaporator 51 may turn, rotate, or otherwise act upon the pinion shaft 47 to assist the operating/powering of the compressor 30, which may be in addition to the drive/power supplied by the drive unit 10.

Embodiments of the compressor 30 may be an integrally geared compressor, a piston compressor, a barrel compressor, a portable compressor, and the like. Compressor 30 may be used for various gas compression applications. Embodiments of compressor 30 may be a centrifugal compressor having of one or more centrifugal compressor stages 31, 32, 33. In some embodiments, the integrated compressor stages 31, 32, 33 may be arranged in a single gearbox, or housing. System requirements may determine a configuration of the compressor 30 and/or a number of compression stages. For example, embodiments of compressor 30 may be a multi-stage compressor, wherein system requirements may dictate a number of centrifugal compression stages. Moreover, compressor 30 may include a gear system. Embodiments of the gear system may be integrated into or arranged in a single housing. The housing may be a gearbox that houses, receives, supports, accommodates, etc., the components of the gear system of the compressor 30. Embodiments of the gear system of the compressor 30 may include a drive shaft 12 that is driven by the drive unit 10, a drive gear 35, a first pinion shaft 44, a first pinion 41, a second pinion shaft 46, a second pinion 42, a third pinion shaft 45, and a third pinion 43. In one embodiment of the geared compressor, three pinions mesh with the drive gear (or bull gear), wherein one pinion is on each side of the drive gear and one pinion on the top of the drive gear. Further, an idler gear may be disposed between the drive gear and the compressor.

Embodiments of the gear system of the compressor 30 may include a drive shaft 12 and a drive gear 35. The drive gear 35 may be operably mounted to the drive shaft 12. For instance, the drive gear 35 may be fastened to the drive shaft 12, wherein rotation of the drive shaft 12 translates to rotation of the drive gear 35. In other embodiments, the drive gear 35 may be structurally integral with the drive shaft 12. The drive shaft 12 may protrude from a front face of the drive gear 35 along a central axis of the drive gear 35, and may also protrude from a back face of the drive gear 35 along the central axis of the drive gear 35. Embodiments of the drive gear 35 may include teeth along an outer, circumferential surface of the drive gear 35. The gear teeth of drive gear 35 may have various spacing, thickness, pitch, size, and the like. Similarly, a size of the drive gear 35 may vary to accomplish different desired speeds, ratios, torque transmission, and the like, of the gear system. Embodiments of the drive gear 35 may be disposed in the housing of the compressor 30. Actuation of the drive gear 35 may result in rotation of the pinions 41, 42, 43, which may then result in rotation of an impeller that may be operably attached to pinion shafts 44, 45, 46.

Furthermore, a compressor stage 31, 32, 33 may be operably connected to each end of the pinion shafts 44, 45, 46. Embodiments of a compressor stage 31, 32, 33 may be an impeller of a centrifugal compressor that is directly mounted to an end of the pinion shafts 44, 45, 46, wherein a gas is drawn in to be compressed by the compressor 30. In an exemplary embodiment, a centrifugal compressor disposed at the end of the first pinion shaft 44 may be a first stage of compression 31, a centrifugal compressor disposed at the end of the second pinion shaft 46 may be a second stage of compression 32, and a centrifugal compressor disposed at the end of the third pinion shaft 45 may be a third stage of compression 33. However, in further embodiments, additional compression stages may be disposed at other ends of the pinion shafts 44, 45, 46.

Referring still to FIG. 1, embodiments of the expansion mechanism 55 may cooperate with a component of the compressor 30, such as pinion shaft 47, to assist the driving/powering of the compressor 30. The operation of the expansion mechanism 55 may result in exhaust gas, which may be directed to a condenser 54 of the waste heat recovery cycle 50. For instance, the gas leaving the expansion mechanism 55 may travel though one or more lines or pipes from the expansion mechanism 55 to a condenser 54, where the gas is condensed by the condenser 54. Embodiments of the condenser 54 may be configured to condense the exhaust gas to a liquid form. The gas may be condensed to a liquid form as a result of the ambient air, or by cooling water, or other means known in the art. In an exemplary embodiment, the condenser 54 may condense the gas to a liquid, which may then be used as and/or combined with the working fluid of the waste heat recovery cycle 50. A pressure of the liquid as a result of the condenser 54 may be increased by one or more pumps 52. Embodiments of the pump 52 may be configured to increase the pressure of the condensed liquid within the cycle 50 between the condenser 54 and the evaporator 51, as well as cause the liquid to flow back to the evaporator 51.

In one exemplary embodiment, depicted by FIG. 1, embodiments of the waste heat recovery system 100 includes an integrally geared centrifugal compressor 30 that includes a first compressor stage 31, a second compressor stage 32, and a third compressor stage 33. Each of the compressor stages 31, 32, 33 may be mounted on respective pinions 41, 42, 43 which meshes with a central driving gear 35. Embodiments of the expansion mechanism 55 may be mounted on an end of a pinion shaft, such as pinion shaft 47, associated with the second pinion 42. Although FIG. 1 depicts the expansion mechanism 55 mounted to a shaft associated with the second pinion 42, an expansion mechanism 55 may be mounted to any of the pinions 41, 42, 43 (or pinion shafts thereof) that may have a free end (e.g. no compressor stage) therein may be mounted on a pinion that is not associated with a compressor stage. In further embodiments, some heat recovery situations may require multiple stages of expansion to best match the cycle used with the available waste heat and system conditions, and these stages may be mounted on one or more pinions. Likewise, while compressor stages 31, 32, 33 are mounted only on one end of each pinion shafts 44, 45, 46, compressor stages may be mounted on each end, and/or expander stages may be mounted on each end, and/or expander stages may be mounted on one end without a compressor stage on the other. The number of pinions may vary with the application, from as few as just one to as many as can be mounted with the gear.

The compressor 30 may also include idler gears, such as idler gear 36. Such idler gears may be disposed between two pinions as shown in FIG. 1, or may be between the drive gear and one or more pinions; i.e. an idler gear may drive multiple pinions. The addition of any number of idler gears disposed in any location is within the scope of this invention.

The drive gear may directly drive all pinions, or may drive one or more idler gears, or any combination thereof.

Figure 2:
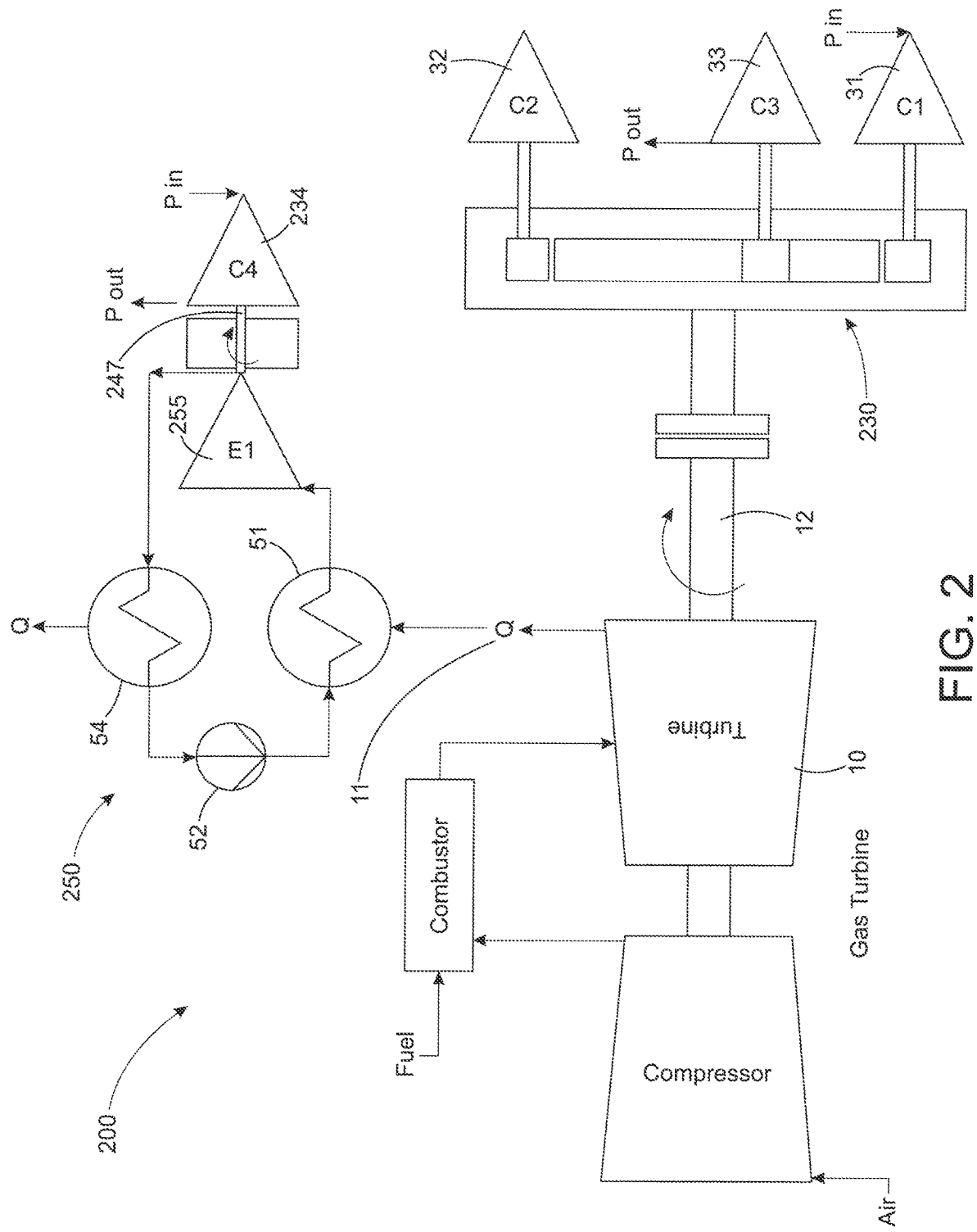
FIG. 2 depicts a schematic illustration of a second embodiment of a waste heat recovery system.

With continued reference to the drawings, FIG. 2 depicts an embodiment of a waste heat recovery system 200. Embodiments of the waste heat recovery system 200 may share the same or substantially the same structure and/or function as the waste heat recovery system 100 described above. For instance, embodiments of the waste heat recovery system 200 may include a drive unit, a compressor, and a waste heat recovery cycle. Embodiments of the waste heat recovery cycle 250 may operate in the same or substantially the same manner as the waste heat recovery cycle 50 described in association with FIG. 1. However, embodiments of the waste heat recovery system 200 may include an expansion mechanism 255 mounted to a shaft 247 of the compressor 30 that is located external to the housing of the integrally geared compressor 30.

FIG. 2 depicts an embodiment of the waste heat recovery system 200 having an integrally geared centrifugal compressor 230 that has four compressor stages 31, 32, 33, 234, wherein the first compression stage 31, the second compression stage 32, and the third compression stage 33 may be mounted on pinions which mesh with a central driving gear, such as gear 35. Embodiments of the fourth compressor stage 234 may be mounted on a shaft 247 that may include an expansion mechanism 255 mounted on an end of the shaft 247. The shaft 247 may be separate from a gearbox of the compressor 230, in an arrangement that may be referred to as a compander. Use of a compander may allow the waste heat recovery system 200 to be conveniently utilized in fairly standard design practices. In similar embodiments where a compander is used for waste heat recovery, the expansion mechanism 255 may be connected to the compressor stage that runs closest to the ideal speed for the turbine. Thus any compressor stage may be driven by the waste heat recovery turbine; it is not necessary have the turbine drive the last compression stage. In further embodiments, some heat recovery situations may require multiple stages of expansion to best match the cycle used with the available waste heat and system conditions, so multiple companders may be used or these stages may be mounted on one or more pinions of the compressor 230. Likewise, while compressor stages 31, 32, 33, 234 are mounted only on one end of each pinion shafts 44, 45, 46, 247, compressor stages may be mounted on each end, and/or expander stages may be mounted on each end, and/or expander stages may be mounted on one end without a compressor stage on the other. In addition, shaft 247 along with expansion mechanism 255 and compressor 234 may be mounted in the gearbox of the compressor 230 without connecting with either drive gear 35 or idler gear 36.

Accordingly, embodiments of the waste heat recovery system 200 may utilize waste heat 11 from the drive unit 10 to assist in powering the compressor 230. The waste heat 11 may be received by the waste heat recovery cycle 250 by the evaporator 51. The evaporator 51 may utilize the waste heat 11 to evaporate a working fluid of the cycle 250, which may then be delivered to the expansion mechanism 255. Embodiments of the expansion mechanism 255 may be operably positioned at an end of the shaft 247, which may be located external to a gearbox of a compressor 230, which may include multiple compression stages. An operation of the expansion mechanism 255 may act upon a compression stage that is a part of the compression process but is independent of drive unit 10.

Figure 3:
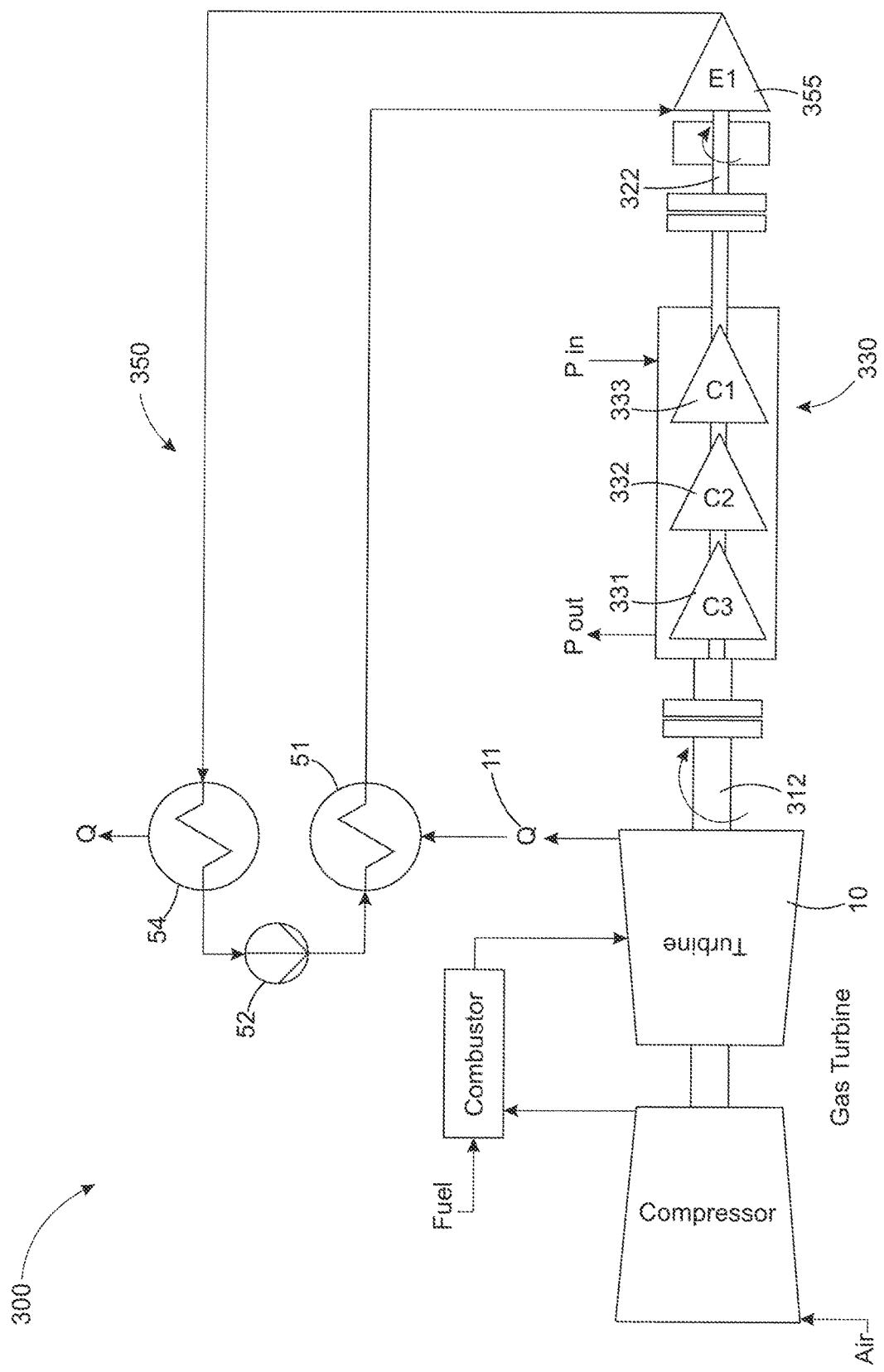
FIG. 3 depicts a schematic illustration of a third embodiment of a waste heat recovery system.

Referring again to the drawings, FIG. 3 depicts an embodiment of waste heat recovery system 300. Embodiments of the waste heat recovery system 300 may share the same or substantially the same structure and/or function as the waste heat recovery system 100, 200 described above. For instance, embodiments of the waste heat recovery system 200 may include a drive unit, a compressor, and a waste heat recovery cycle. Embodiments of the waste heat recovery cycle 350 may operate in the same or substantially the same manner as the waste heat recovery cycle 50, 250 described in association with FIGS. 1 and 2. However, embodiments of the waste heat recovery system 300 may include a barrel compressor 330 operably coupled to the drive unit 10, with an expansion mechanism 355 mounted at one end of a shaft connected to the drive unit 10.

FIG. 3 depicts an embodiment of the waste heat recovery system 300 having a barrel-type centrifugal compressor 330 that has multiple compressor stages, 331, 332, 333. An expansion mechanism 355 may be mounted at one end of the compressor shaft 322. For instance, one end of the compressor shaft 322 may be operably coupled to drive shaft 312 that may also be operably coupled to the drive unit 10, while the opposing end of the compressor shaft 322 may be operably coupled to the expansion mechanism 355. In an alternative embodiment, the expansion mechanism 355 may be directly coupled to the drive unit 10. In yet another embodiment, additional expander stages may be integrated into the barrel compressor 330. Moreover, embodiments of the compressor 330 may be any type of shaft driven positive or dynamic compressor; including but not limited to reciprocating, rotary screw, rotary vane, rolling piston, scroll, centrifugal, mixed-flow, or axial compressors. Some heat recovery situations may require multiple stages of expansion to best match the cycle used with the available waste heat and system conditions.

Accordingly, embodiments of the waste heat recovery system 300 may utilize waste heat 11 from the drive unit 10 to assist in powering the compressor 330. The waste heat 11 may be received by the waste heat recovery cycle 350 by the evaporator 51. The evaporator 51 may utilize the waste heat 11 to evaporate a working fluid of the cycle 350, which may then be delivered to the expansion mechanism 355. Embodiments of the expansion mechanism 355 may be operably positioned at an end of the compressor shaft 322 of the compressor 330. An operation of the expansion mechanism 355 may act upon the drive shaft 312, which may assist the drive unit 10 in rotating the drive shaft 312 to power the compressor 330.

Each of the waste heat recovery systems 100, 200, 300 may harness or otherwise use the waste heat from a drive unit 10, such as a gas turbine, as a power source in a waste heat recovery cycle 50, 250, 350, such as an organic rankine cycle. Embodiments of the waste heat recovery cycle 50, 250, 350 may include an expansion mechanism 55, 255, 355, and the power, such as a mechanical power, generated from the expansion mechanism 55, 255, 355 may be transmitted or transferred to a compressor stage 234 or to a compressor 30, 230, 330 to assist in driving or otherwise powering the compressor stage 234 or to a compressor 30, 230, 330. Thus, the compressor 30, 230, 330 may be driven at one or more locations and/or by two driving sources, which can reduce the work or load required by a single drive unit 10. The transmission/transfer of the power from the expansion mechanism 55, 255, 355 may be direct, or may involve one or more gears to accommodate various types of gas compression applications, and multiple types of compressors.

With reference to FIGS. 1-3, a method of using waste heat recovery to assist in driving/powering a compression system may include the steps of incorporating or coupling a waste heat recovery cycle 50, 250, 350 to a drive unit 10 and a compressor 30, 230, 330, and delivering a mechanical power from the waste heat recovery cycle 50, 250, 350 to the compressor.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A waste heat recovery system comprising:
    a drive unit having a drive shaft;
    a compressor fluidically separate from the drive unit, and coupled to the drive shaft;
    an expansion mechanism coupled to the compressor via a rotating shaft that is separate from the drive shaft; and
    a waste heat recovery cycle that utilizes a waste heat of the drive unit to evaporate a working fluid flowing to the expansion mechanism;
    wherein the expansion mechanism is configured to transmit a mechanical power to the compressor via the rotating shaft, thereby reducing a power required by the drive unit to drive the compressor.

2. The waste heat recovery system of claim 1, wherein the waste heat recovery cycle includes a pump configured to increase a pressure of the working fluid flowing within the closed loop cycle.

3. The waste recovery system of claim 1, wherein the waste heat recovery cycle includes an evaporator configured to evaporate the working fluid flowing through a closed loop cycle to the expansion mechanism.

4. The waste heat recovery system of claim 1, wherein the rotating shaft drives a shaft driving a compressor stage of the compressor which is not mechanically connected to other stages of the compressor.

5. The waste heat recovery system of claim 1, wherein the drive unit is a gas turbine.

6. The waste heat recovery system of claim 1, wherein the compressor is an integrally geared compressor having multiple compression stages.

7. The waste heat recovery system of claim 1, wherein the drive shaft is a main drive shaft powering the compressor.

8. A method of using waste heat recovery to assist in driving/powering a compression system, comprising:
    coupling a waste heat recovery cycle to a drive unit and to a compressor that is fluidically separate from the drive unit, the drive unit being coupled to the compressor via a drive shaft, wherein the waste heat recovery cycle utilizes a waste heat of the drive unit to evaporate a working fluid flowing to an expansion mechanism coupled to the compressor via a rotating shaft of the compressor that is separate from the drive shaft, the expansion mechanism configured to transmit a mechanical power to the compressor via the rotating shaft.

9. The method of claim 8, wherein the waste heat recovery cycle includes a pump configured to increase a pressure of the working fluid flowing within the closed loop cycle.

10. The method of claim 9, wherein the rotating shaft drives a shaft of a compressor stage of the compressor which is not mechanically connected to other stages of the compressor.

11. The method of claim 8, wherein the waste heat recovery cycle includes an evaporator configured to evaporate the working fluid flowing through a closed loop cycle to the expansion mechanism.

12. The method of claim 8, wherein the drive unit is a gas turbine.

13. The method of claim 8, wherein the compressor is an integrally geared compressor having multiple compression stages.

14. A method comprising:
    heating a working fluid in a closed loop cycle to evaporate the working fluid into a gas phase by directing a waste heat from a drive unit coupled to a compressor, which is fluidically separate from the drive unit, to an evaporator of the closed loop cycle;
    delivering the gas phase of the working fluid in the closed loop cycle to an expansion mechanism located in the closed loop cycle;
    transmitting a mechanical power to the compressor by operation of the expansion mechanism, which is mechanically coupled to a rotating shaft that is separate from the drive unit, wherein the working fluid evaporated by the evaporator flows through the closed loop cycle to the expansion mechanism, further wherein the mechanical power is transmitted to the compressor via the rotating shaft for adding compression separate from compression resulting from operating of the drive unit, thereby reducing a power required by the drive unit to drive the compressor; and
    condensing an exhaust gas produced by the operation of the expansion mechanism back to a liquid phase to be used as the working fluid flowing through the evaporator of the closed loop cycle.

\* \* \* \* \*